United States Patent
Le Bihan et al.

(10) Patent No.: US 12,231,734 B2
(45) Date of Patent: Feb. 18, 2025

(54) ORDERING A SERVICE USING THE PROCESSING OF A STREAM COMPRISING MULTIMEDIA DATA

(71) Applicant: ORANGE, Issy-les-Moulineaux (FR)

(72) Inventors: Murièle Le Bihan, Chatillon (FR); Emmanuel Soyer, Chatillon (FR); Dominique Poitevin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/606,630

(22) PCT Filed: Apr. 24, 2020

(86) PCT No.: PCT/EP2020/061503
§ 371 (c)(1),
(2) Date: Oct. 26, 2021

(87) PCT Pub. No.: WO2020/216926
PCT Pub. Date: Oct. 29, 2020

(65) Prior Publication Data
US 2022/0232292 A1    Jul. 21, 2022

(30) Foreign Application Priority Data
Apr. 26, 2019 (FR) ...................... 1904469

(51) Int. Cl.
*H04N 21/478* (2011.01)
*H04N 21/422* (2011.01)
(Continued)

(52) U.S. Cl.
CPC . *H04N 21/47815* (2013.01); *H04N 21/42203* (2013.01); *H04N 21/4722* (2013.01); *H04N 21/6587* (2013.01); *H04N 21/8456* (2013.01)

(58) Field of Classification Search
None
See application file for complete search history.

(56) References Cited

U.S. PATENT DOCUMENTS 8,914,365 B2 * 12/2014 Lenahan ............ H04N 21/4788
707/765
10,271,109 B1    4/2019 Davoust
(Continued)

OTHER PUBLICATIONS

International Search Report dated May 15, 2020 for corresponding International Application No. PCT/EP2020/061503, Apr. 24, 2020.
(Continued)

*Primary Examiner* — Alexander Q Huerta
(74) *Attorney, Agent, or Firm* — David D. Brush; Westman, Champlin & Koehler, P.A.

(57) ABSTRACT

In the field of processing streams of audiovisual data, particularly multimedia data, a method for ordering the purchase of a service. A sequence that relates to the service is contained in a multimedia data stream played by a playback device. The multimedia data stream includes a plurality of sequences relating to respective services and associated with respective playback timestamps. The ordering method includes: determining a service identifier corresponding to a playback timestamp of a sequence associated with the service, the playback timestamp of the sequence associated with the service having been determined as a function of a timestamp of an order signal for purchasing a service, the order signal having been generated by a human-machine interface and transmitted by the human-machine interface to a management server distinct from a terminal receiving the multimedia data stream; the service identifier making it possible to generate a signal to save the purchase.

15 Claims, 2 Drawing Sheets

(51) Int. Cl.
  *H04N 21/4722* (2011.01)
  *H04N 21/6587* (2011.01)
  *H04N 21/845* (2011.01)

(56) References Cited

U.S. PATENT DOCUMENTS

| | | | |
|---|---|---|---|
| 2006/0259299 A1 | 11/2006 | Kato et al. | |
| 2009/0307092 A1* | 12/2009 | Gugliuzza | G06Q 30/0601 |
| | | | 715/716 |
| 2011/0162002 A1* | 6/2011 | Jones | G06Q 30/0241 |
| | | | 725/32 |
| 2013/0251337 A1* | 9/2013 | Abecassis | H04N 21/47217 |
| | | | 386/239 |
| 2013/0325466 A1* | 12/2013 | Babin | H04N 21/47217 |
| | | | 704/235 |
| 2013/0346256 A1* | 12/2013 | Canavan | G06Q 20/123 |
| | | | 709/217 |
| 2014/0282677 A1* | 9/2014 | Mantell | H04N 21/435 |
| | | | 725/23 |
| 2014/0379469 A1* | 12/2014 | Cipolletta | H04N 21/482 |
| | | | 705/14.53 |
| 2015/0189341 A1* | 7/2015 | McCarthy | H04N 21/812 |
| | | | 725/112 |
| 2016/0205447 A1* | 7/2016 | Liden | H04N 21/84 |
| | | | 725/19 |
| 2017/0142460 A1* | 5/2017 | Yang | H04N 21/4627 |
| 2017/0208371 A1* | 7/2017 | Pettis | H04N 21/25891 |
| 2017/0289643 A1* | 10/2017 | Kachkova | H04N 21/6587 |
| 2018/0176647 A1 | 6/2018 | Gregov et al. | |
| 2019/0075373 A1 | 3/2019 | Da Fonseca et al. | |
| 2020/0058043 A1* | 2/2020 | Wheatley | H04N 21/4725 |

OTHER PUBLICATIONS

Written Opinion of the International Searching Authority dated May 15, 2020 for corresponding International Application No. PCT/EP2020/061503, filed Apr. 24, 2020.

English translation of the Written Opinion of the International Searching Authority dated May 27, 2020 for corresponding International Application No. PCT/EP2020/061503, filed Apr. 24, 2020.

* cited by examiner

ORDERING A SERVICE USING THE PROCESSING OF A STREAM COMPRISING MULTIMEDIA DATA

CROSS-REFERENCE TO RELATED APPLICATIONS

This Application is a Section 371 National Stage Application of International Application No. PCT/EP2020/061503, filed Apr. 24, 2020, the content of which is incorporated herein by reference in its entirety, and published as WO 2020/216926 on Oct. 29, 2020, not in English.

FIELD OF THE DISCLOSURE

This invention relates to the field of processing streams of audiovisual data, in particular multimedia data, for the management of an order signal for a service.

BACKGROUND OF THE DISCLOSURE

Referring to FIG. 1, such an order signal for a service is generated as follows. A terminal STB, connected to a playback device TV, receives a multimedia data stream F in order to play, on the device TV, multimedia content corresponding to the multimedia data. This stream F may be for example a real-time television data stream and the terminal STB may be for example a set top box, connected to a television set TV as the playback device, enabling a user UT to watch a television program. Alternatively, the terminal STB and the device TV can be integrated into the same connected device, such as a tablet, PC, or other type, in order to receive such a television data stream via a television application and a wide area network RES such as the Internet for example. In another alternative, the stream F can be a real-time radio broadcast data stream and the terminal STB can include a tuner and be integrated into a radio set as the playback device, enabling a user UT to listen to the program of a radio station. In another alternative, the multimedia content can be any pre-recording and not necessarily streamed content being broadcast in real time or slightly delayed.

In particular, this multimedia content is likely to include one or more sequences containing information relating to respective services, at respective times in the playing of the content. For example, these sequences can be advertising messages describing respective products. Usually, such messages last around ten seconds and can follow one another over time.

With reference again to FIG. 1, which in the example shown illustrates the case of a viewing user UT watching a television program on the TV set, when an advertisement for a product of interest to the user UT is played on the device TV, the user can operate a human-machine interface IHM (for example a voice interface) to order the product of interest (or to add the product to a shopping list or to a cart ("shopping list", "wallet", or other)) with a view to ordering it later. This order signal SC can be transmitted via the network RES to a management server SER. The server SER can for example request an order confirmation CC from the user UT in return, via an input interface (provided on a user device TER, for example a touch screen of a device TER such as a smartphone, tablet, PC or the like). Thus, when the order signal SC is received by the server, for a clearly identified product, the server SER can transmit reference data CC for this clearly identified product, so that such references are displayed for example on the screen of the device TER. An application installed on the aforementioned device TER comes to life in order to ask the user to enter a confirmation approving this product via the input interface of the device TER, which can then trigger the final saving of the product order on the server SER or another server (of a distributor of the product or the like).

For example, in the case where the interface IHM is a voice assistant, a natural way for the user UT to issue this order is to say a word such as "I want this product" or "add" (to a pre-existing list of shopping items for example). In general, one problem observed is that a user does not say (or more generally does not wish to enter) all the features of the product whose advertisement is currently being played. It is then difficult for the management server SER to identify exactly which product the user wishes to order.

The invention then improves the situation.

SUMMARY

According to a first aspect, a method for ordering a purchase of a service is proposed, a sequence relating to said service being comprised in a multimedia data stream played by a playback device (TV), the multimedia data stream comprising a plurality of sequences relating to respective services and associated with respective playback timestamps, the ordering method comprising:

determining (S5) a service identifier corresponding to a playback timestamp of a sequence associated with said service, the playback timestamp of the sequence associated with said service having been determined as a function of a timestamp of an order signal (HRC) for purchasing a service, the order signal having been generated by a human-machine interface (IHM) and transmitted by the human-machine interface to a management server (SER) that is distinct from a terminal (STB) receiving the multimedia data stream; the service identifier making it possible to generate a signal to save the purchase.

Thus, such an embodiment makes it possible to differentiate the service (or the product as presented above) whose sequence has caused an order signal to be sent from the human-machine interface (IHM) and to do so without forcing the user (UT) of this interface (IHM) to specify all the characteristics needed to identify this service.

In one embodiment, the ordering method comprises determining (S4), based on a predetermined criterion, a timestamp among the scheduled playback timestamps of sequences as corresponding to the generation timestamp of the order signal.

In one embodiment, the predetermined criterion consists of determining the closest scheduled playback timestamp prior to the generation timestamp of the order signal. As illustrated in FIG. 2 by way of example, in a succession of scheduled playback timestamps HR1, HR2, etc. of respective sequences, the closest timestamp prior to the generation timestamp HRC of the order signal is HR2. In one embodiment, it is further possible to add a latency time, which may be constant (for example five seconds), to the timestamps HR1, HR2, etc., and to determine the closest accordingly increased timestamp that precedes timestamp HRC, in order to take into account a possible user reaction time. The duration of this latency can be adjusted based on tests carried out on a panel of users.

In one embodiment, the method further comprises:

after determining the service identifier corresponding to the determined timestamp, obtaining, based on the service identifier, additional informational data about the service, managing a rendering of additional informational data about the service, with a view to the user approving the saving of the order for the service, on an input interface available to the user.

For example, the additional informational data may come from a connected database, listing service identifiers linking to additional informational data about respective services.

This typically can be a database connected to a server managed by an advertiser of the service or services offered in the multimedia content.

In this embodiment, as in the previous embodiment, provision is of course made for the server (SER) to store a database of users which links to:

a reference for their voice assistant type of interface (IHM) from which the server receives the signal to save the order, a reference for their terminal (STB) receiving the stream, and at least one reference for their device (TER).

Furthermore, the aforementioned multimedia data stream (F) can typically be a television or radio data stream, broadcast in real time (or slightly delayed), or rebroadcast or "replay" (or else a broadcast data stream, recorded for example on a personal video recorder (or "PVR") and played back).

Thus, advertising spots can appear in this stream that correspond to the aforementioned sequences containing information relating to respective services. In principle, the expected broadcast time of these sequences (in real time, relative to the moment when the data is sent from a station headend; or deferred, relative to the moment when the stream begins to be read) is known and a timestamp can thus be associated with each sequence and thence with each service identifier corresponding to this sequence. In general, during replay the terminal can play a list ("playlist") of several video streams often comprising a chain of N streams starting with one or more advertising sequences and continuing with content.

According to another aspect, a device for ordering the purchase of a service is proposed, a sequence relating to said service being comprised in a multimedia data stream played by a playback device (TV), the multimedia data stream comprising a plurality of sequences relating to respective services and associated with respective playback timestamps, the ordering device comprising:

a processor configured to determine a service identifier corresponding to a playback timestamp of a sequence associated with said service, the playback timestamp of the sequence associated with said service having been determined as a function of a timestamp of an order signal (HRC) for purchasing a service, the order signal having been generated by a human-machine interface (IHM) and transmitted by the human-machine interface to a management server (SER) that is distinct from a terminal (STB) receiving the multimedia data stream; the service identifier making it possible to generate a signal to save the purchase.

Such a device can be implemented in a management server (SER) which, as indicated above, can be configured to receive the order signals generated by the human-machine interface (IHM). The management server is in particular configured to implement steps of the above method and more particularly the aforementioned timestamp comparison in order to select the timestamp corresponding to the generation timestamp of the order signal, and the determination of the service identifier corresponding to the determined timestamp.

In one embodiment, the device for ordering a purchase comprises a timestamp comparator for determining the timestamp corresponding to the generation timestamp of the order signal, and the determination of the service identifier corresponding to the selected timestamp, at least, are carried out by the management server.

In one embodiment, the device for ordering a purchase comprises a timestamp comparator for determining the timestamp corresponding to the generation timestamp of the order signal, and the determination of the service identifier corresponding to the selected timestamp, at least, are carried out by the management server (SER).

In this case, the server (SER) queries the terminal (STB) receiving the stream in order to retrieve the timestamps of the scheduled sequences in the stream, and to carry out the aforementioned comparison.

Alternatively, the server (SER) can query a third-party server (SERA) which provides a publication of the timestamps of the scheduled sequences, with the corresponding identifiers, this third-party server (SERA) being maintained by an advertising division of a TV broadcasting channel, for example. Thus, by querying this third-party server, it is possible to retrieve the timestamps of the advertising sequences.

In one embodiment of a device for ordering a purchase according to one of claim 10 or 11, the management server (SER) implementing the device for ordering a purchase is connected to a user device (TER) integrating at least one input interface, the management server comprising:

a generator of a signal to save the order for the service, a transmitter sending the signal to save the order for the service to the device (TER), for the user to approve such a save, and a transmitter configured to return to the device (TER) the signal to save the order, for confirmation of the saving of the order (COM OK) upon receipt by the management server (SER) of an approval signal from the device (TER) after the user enters his or her approval.

It will thus be understood that in this embodiment, the signal to save the order in fact indicates a pre-saving of the order, and this order is finally saved only after approval by the user. For example, the device (TER) can receive from the management server (SER) (or even from a server managed by a service provider) an order confirmation request to be approved for example via a touch screen of the device (TER). For example, the device (TER) can present on a screen a list of services for which the order is to be confirmed and the user can select them one by one to approve them by pressing on the various services offered to him or her on the touch screen.

It will be understood here that the management server SER may be a single server for implementing the various steps above or may be connected to other servers (managed by the advertiser, by the service provider, and/or others), thus forming a "server entity" in general (also called a "platform" in the detailed description which follows).

Alternatively, such a device can be implemented in a terminal (STB) for receiving a multimedia data stream (F). In particular, the terminal is configured to implement steps of the above method and more particularly the timestamp comparison in order to select the timestamp corresponding to the generation timestamp of the order signal, the determination of the corresponding service identifier at the determined timestamp, and a transmission to the management server of the service identifier corresponding to the determined timestamp.

Furthermore, the terminal (STB) is configured to receive additional informational data for rendering by the playback device (TV), the additional informational data having been obtained by the device for ordering a purchase, based on the service identifier. However, alternatively, it is possible to transmit this additional informational data on the user's device (TER).

In another alternative, the device for ordering a purchase comprises a timestamp comparator (S3) for selecting (S4) the timestamp corresponding to the generation timestamp of the order signal, and the determination (S5) of the service identifier corresponding to the selected timestamp, are carried out by the terminal (STB), and the terminal (STB) sends to the management server the service identifier corresponding to the selected timestamp.

This embodiment can be particularly advantageous in the case where a remote control button is simply pressed by the user to control the terminal (STB) instead of providing a voice assistant type of interface IHM. In this case, it is the terminal (STB) which performs the comparison between the timestamps of the sequences it receives and the timestamp of the event of pressing the remote control button, until it is thus able to retrieve the identifier of the service whose sequence has the closest timestamp and to send this service identifier to the server (SER).

According to another aspect, there is proposed a human-machine interface connected to a management server distinct from a terminal (STB) receiving a multimedia data stream played by a playback device (TV), the multimedia data stream comprising a plurality of sequences relating to respective services and associated with respective playback timestamps, wherein the human-machine interface comprises a generator of an order signal (HRC) for purchasing a service and a transmitter of the order signal for purchasing the service to a management server (SER) distinct from a terminal (STB) receiving the data stream, the order signal having a timestamp making it possible to determine a playback timestamp of the sequence associated with said service, the playback timestamp of the sequence associated with said service making it possible to determine a service identifier enabling the generation of a signal to save the purchase.

In one embodiment, the aforementioned human-machine interface can be a connected voice assistant (for example a "djingo"® type of connected speaker). For example, this voice assistant can be connected to a home gateway via a local area network, said gateway being able to communicate with the management server SER via a wide area network.

In a variant, this voice assistant can be integrated into a device such as a smartphone or other device (the interface including a microphone of such a device), this device being connected via the wide area network (cellular or wifi) to the server SER. This may for example be the same device TER (FIG. 1) comprising an input interface enabling the user to subsequently confirm his or her order.

In such an embodiment, the generated order signal is then a speech signal.

Thus, the method may include a conversion of the speech signal into text containing a series of characters (called a "speech to text" conversion) in order to identify at least one keyword characterizing a service order, for example such as the word "Add" or the like. For example, this or these keywords may describe the type of service ordered: for example a product order ("Add this product"), an order for a discount coupon ("Add this discount"), or the like.

More generally, variants to the use of a voice assistant are possible for the actuation of the aforementioned human-machine interface. Indeed, as an alternative to a user saying the word "Add" to order a service, it is possible, for example, to provide a remote control for the terminal STB comprising a specific button to press in order to send the service order to the terminal STB which can send the order request on to the management server STB via a bidirectional link. In another alternative, the aforementioned device TER can offer a computer application with an order button which, when pressed, causes this order request to be sent to the management server SER via the network RES.

According to another aspect, a system for ordering a service is proposed, comprising at least:
- a terminal for receiving a multimedia data stream,
- a playback device, connected to the terminal, for playing multimedia content corresponding to the multimedia data, said multimedia content comprising a plurality of sequences containing information relating to respective services, at respective playback times in the content,
- a human-machine interface available to a user for generating an order signal for a service whose sequence may currently be in the process of being played by the device, and transmitting the order signal with a generation timestamp of the order signal and a user reference,
- a management server, able to process the order signal for the service with a view to saving the order for the service for this user, wherein the terminal is arranged to receive, in addition to the multimedia data, data of:
- respective scheduled playback timestamps of the sequences,
- with respective service identifiers, and at least one among the terminal and the management server is arranged for:
- comparing the generation timestamp of the order signal with the respective scheduled playback timestamps of the sequences,
- selecting, based on a predetermined criterion, a timestamp among the scheduled playback timestamps of the sequences as corresponding to the generation timestamp of the order signal,
- determining the service identifier corresponding to the determined timestamp,
- and generating a signal to save the order for the service whose identifier is thus determined.

According to another aspect, a computer program is provided comprising instructions for implementing all or part of a method as defined herein when this program is executed by a processor. According to another aspect, a non-transitory computer-readable storage medium is provided, on which such a program is stored.

The instructions of such a computer program can be distributed among different entities of the above system (for example between the terminal (STB) and the management server). The general flowchart of such a computer program can be represented by way of example as in one of FIGS. 3 and 4 discussed below.

BRIEF DESCRIPTION OF THE DRAWINGS

Moreover, other features, details, and advantages will become apparent upon reading the detailed description below, and upon analyzing the appended drawings, in which, in addition to.

DETAILED DESCRIPTION OF ILLUSTRATIVE EMBODIMENTS

Figure 3:
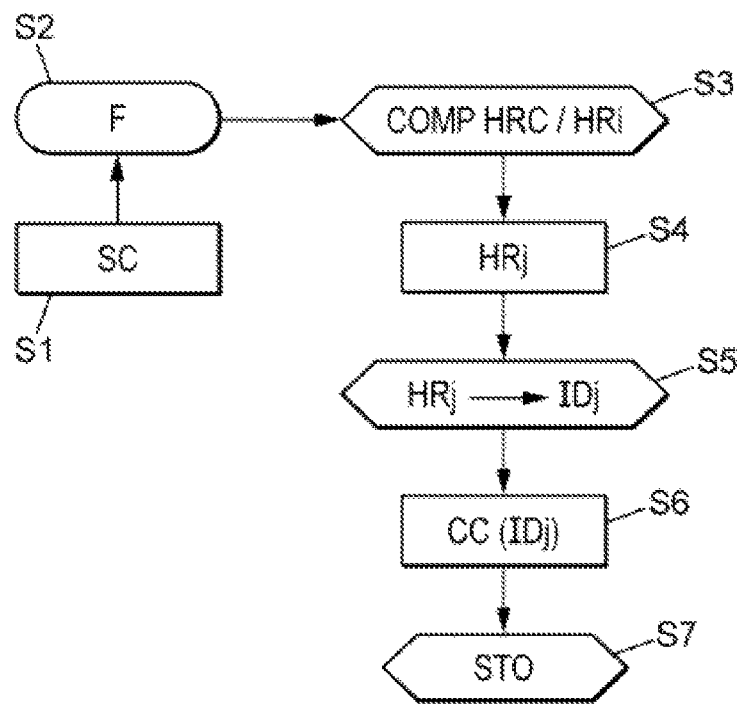
FIG. 3 shows a succession of steps that may be comprised in a method of the type defined above.

Reference is now made to FIG. 3 to describe the steps of the method which can be implemented at the stream-receiving terminal STB or at the management server SER. Upon receiving the order signal SC in step S1, metadata describing timestamps of service description sequences (typically advertising spots for such services) are extracted from the stream F that the terminal STB receives in step S2. In one embodiment where the terminal STB itself performs the first steps of FIG. 3, the terminal STB extracts these metadata from the stream F that it receives, for its own subsequent use. In an embodiment where the server SER implements the steps of FIG. 3, the order signal SC is received in step S1 by the management server SER, which triggers a request from the server SER to the terminal STB in order to retrieve this metadata for processing at the server.

An embodiment may be provided in which the terminal STB analyzes and extracts from the stream a signaling specific to the scheduled advertising sequences and comprising markers of these sequences (timestamps and identifiers) inserted in the stream, with a "parsing" of the associated descriptors in real time, in order to store these data in a FIFO buffer memory. The server SER can initiate actions at the terminal STB side, such as reconciliation on the timestamp and then reconciliation on the advertising campaign identifier (PubID) with an identifier of the product that is the subject of the advertisement (GTIN), as described in detail. further below.

In one general embodiment, the terminal STB and/or the management server SER are configured to thus assign a reception timestamp HRC for the order signal SC in step S1. Thus, in step S3, a comparison can be made of this timestamp HRC with the timestamp data HR1, HR2, . . . , HRi, etc. received in the stream F, as described above with reference to FIG. 2, to then identify, in step S4, the timestamp HRj that best matches the timestamp HRC of the order signal.

The timestamps HR1, HR2, . . . , HRi, etc. are received in the stream F with respective service identifiers ID1, ID2, . . . , IDi, etc. Thus, it is possible in step S5 to determine the service identifier IDj corresponding to the timestamp determined in step S4 and specific to the service which is the object of the order SC. In the case of a playlist in replay, one can first determine which stream number in the playlist the timestamp corresponds to, and this stream number can then be associated with a service identifier (pub id).

The management server SER can then retrieve additional information CC specific to this service identifier IDj in step S6, or the terminal STB can ask the server SER for such informational data, with a view to rendering it for example on the playback device TV, in order to allow a user to definitively approve this order (via a device TER such as a smartphone or other), a message of such an approval then being transmitted to the management server SER for storage in step S7 for any follow-up action for this order.

As indicated above, the steps of FIG. 3 can be implemented completely or partially by the terminal STB or by the management server SER. Nevertheless, in particular to save bandwidth, it may be advantageous for the timestamp comparison to be carried out by the terminal STB, at the request of the server SER (when it receives the order signal SC), and for the terminal TER to send back to the SER server only the relevant service identifier IDj.

Figure 4:
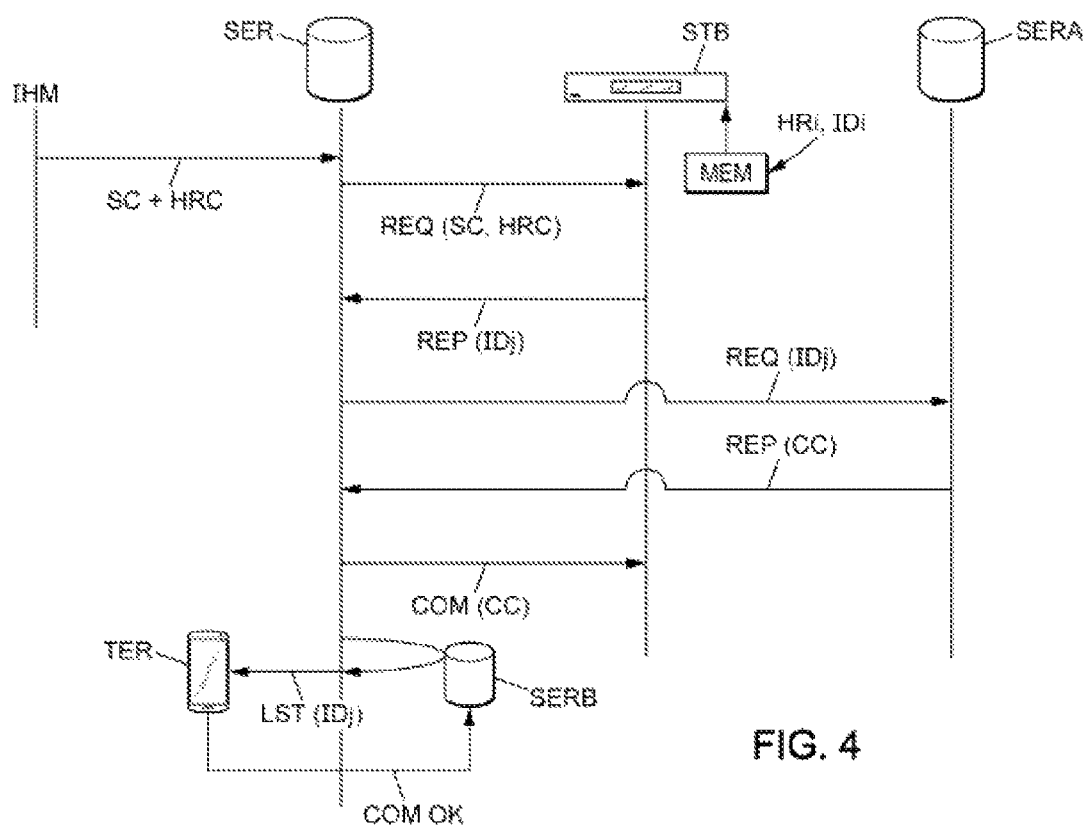
FIG. 4 illustrates the exchanges between various entities of a system of the above type.

Reference is now made to FIG. 4, to illustrate the various exchanges in this embodiment.

The human-machine interface IHM, such as a voice assistant, transmits the order signal SC (for example in the form of a speech signal) to the management server SER along with the generation timestamp HRC of this signal. Possibly, as an alternative, the timestamp SER is assigned by the server SER upon receipt of the order signal SC. The management server SER sends a request REQ(SC, HRC) to the terminal STB to compare an order timestamp HRC to sequence timestamps in the stream F. For this purpose, the management server SER maintains a user database which links identification data of the IHM and of the terminal STB (and also of the device TER, as described below). The terminal STB performs the timestamp comparison and for this purpose has a memory MEM (for example a FIFO (first in-first out) type of buffer memory) to store the timestamps HRi received in the stream that correspond to the service identifiers IDi. After determining the timestamp and the corresponding service (steps S3 to S5 of FIG. 3), the terminal STB, in response to the request REQ(SC, HRC), sends back the identifier thus determined IDj, in a response message REP (IDj).

The server SER can then query a third-party server SERA (for example managed by an advertiser) in order to reconcile a campaign identifier (PubID) corresponding to the identifier IDj with a product identifier that is the subject of the advertisement (GTIN identifier) (in addition to discount campaigns or visuals associated with this product). More generally, the server SER can thus retrieve additional data CC about this identifier service IDj and transmit them (arrow COM(CC)) to the terminal STB for rendering by the playback device TV. For example, it may be a banner superimposed on the current image, which is displayed on the screen of a television set, this banner indicating that an order has been placed for a given service (with specific characteristics). The banner can also indicate that a message requesting an order confirmation will be sent to the device TER (for example a smartphone with a touch screen) for final approval of the order. The confirmation that a product has been added (for example to a shopping list) is also conceivable by voice rendering, and in this case the server SER sends to the terminal STB a confirmation message to be voiced by the playback device TV, for example such as "product XX has been added to your shopping list".

At the same time, the management server SER can communicate with a third-party server SERB of a service provider, for example a product distributor, in order to send to the device TER a list of products awaiting order confirmation by the user of the device TER. This list, which may be displayed on the touch screen of the device TER, then shows the references of the service or product whose identifier IDj has been determined and the user can indicate final approval of the order by using the touch screen for example. This approval message COM OK is then received by the server of the provider SERB in order to store the order with a view to processing it and thus provide the user with this service IDj.

Such an embodiment can be generalized to any broadcast stream (television, radio, rebroadcast or "replay", etc.) received by a terminal STB for receiving broadcast content which can be a "TV decoder" or radio decoder, a smart television, a smart radio, or other. The content that is broadcast can be any type of content relating to at least one marketable product: advertisement, teleshopping, music show (purchase of the song), games (the proposed winnings can be purchased by viewers/listeners), etc.

The aforementioned voice assistant IHM may in particular be a voice assistant such as Djingo or Alexa, or an assistant of a smartphone or a tablet distinct from the terminal STB receiving the broadcast content. Such a voice assistant IHM can operate as follows. Initially, the user of the broadcast content can wake up the assistant IHM, which triggers a tracking by the assistant IHM of a forthcoming order time. Secondly, with the broadcast content comprising a sequence relating to a marketable product, the user can indicate to the assistant IHM the action to be taken, via a keyword (for example "Add"):
- add a product to a shopping list,
- display a current promotion,
- add a discount coupon to the shopping list, or other.

The assistant IHM saves the order and associates it with a timestamp HRC for the moment at which the user made his request, and sends to the platform SER from the assistant IHM a request to recognize the request made by the user. This could be a signal containing an audio recording of the user-ordered action and the timestamp HRC.

Thirdly, the platform SER performs a speech-to-text conversion of the user's request and can determine, for example, that the name of the product to be added to the shopping list is missing.

Fourthly, the platform SER directly or indirectly queries the receiver STB of the broadcast content, which provides an identifier IDj corresponding to the advertising spot inserted into the stream of broadcast content. The data of this identifier can be declared by the variable "Pubid".

The identifier may in particular be positioned in the stream at the start of the advertising spot or before the advertising spot. In a practical implementation, the term "positioned in the stream" is understood here to mean that the aforementioned identifier is presented as a tag signal (in the form of a command for example), marking the start of an advertising sequence positioned in the stream with which a descriptor ("segmentation descriptor") containing the identifier IDj (or Pubid) can be associated.

The receiver of the broadcast content STB is able to check whether the timestamp HRC of the user's request is positioned within the broadcast timespan of a given advertising spot in order to find the identifier IDj corresponding to this advertising spot. In particular, the receiver of the broadcast content keeps, in a memory buffer MEM, the most recent identifiers IDi (or "Pubid") and the start and/or end time of the broadcast of the corresponding advertising spot.

Above, "querying directly" is understood to mean the fact that the platform SER is connected by a wide area network (WAN/API) with the receiver of the broadcast content STB, in order to query it directly. "Querying indirectly" is understood to mean that the platform SER sends to the assistant IHM the identifier request Pubid intended for the receiver of the broadcast content STB. Such an implementation assumes that the assistant IHM and the terminal STB are connected to a local area network and thus the assistant IHM is connected via this local area network (LAN/API) to the receiver of the broadcast content STB to which the assistant IHM can then transmit the request and from which it receives in return the identifier Pubid that it relays to the platform SER.

The third-party server of the advertiser partner SERA can provide a more complete product identifier (which can be declared by a variable GTIN) with the aforementioned additional data CC (equivalent to a "bar code" of the product corresponding to this identifier Pubid), either directly to the receiver of the broadcast content STB or to the platform SER. In the event that the receiver STB receives the product identifier GTIN, it send this to the platform SER in addition to or instead of the identifier Pubid.

Fifthly, the platform SER uses a server of a vendor partner SERB to add the product to the user's shopping list LST by means of the retrieved product identifier GTIN.

Thus, the retrieval of a sequence identifier IDj or Pubid, then of the more complete identifier GTIN or CC of the product, does not require explicit identification by the user nor complex recognition of the product by the platform SER, thus reducing the chance of errors of adding products unnecessarily.

In general, the order can be for a product or a service. For example, it could involve adding:
- the product concerned by the advertising spot, automatically without explicitly naming it, to a shopping list available in a mobile application (operator and/or distributor) with potentially all the descriptive elements being provided by the advertiser (descriptive text, visual, etc.),
- a discount coupon associated with the product, without explicitly naming it, in an application of the distributor.

The proposed solution is based on indicating the advertising spot inserted in the stream F, for example by marking ("frame accurate") the start of the spot, with which is associated information concerning the campaign identifier of the advertising spot (typically the aforementioned identifier Pubid or IDj in the figures).

The proposed solution is also based on synchronization between the decoding receiver STB and the voice assistant IHM, so that this temporal and descriptive information about the sequence of the advertising spot, available from the receiver STB, is sent on to the platform SER directly (via WAN API) or possibly indirectly by the assistant IHM (via LAN API) all the way to the platform.

As the duration of an advertising spot is short (20 seconds on average in television), the proposed solution makes it possible to avoid, if the voice interaction takes place at the end of the spot, adding the product of the following spot to the shopping list. Optionally, it is also possible to take into account a latency time that is characteristic of a user, as indicated above.

The proposed solution allows the product to be added "implicitly" to the user's shopping list (i.e. without the user having to say the full exact name of the product). The user can thus add, in a simplified and generic manner, the reference of a product and/or any commercial information (promotions, product visuals, etc.) in a mobile/internet application, aggregating all of his or her already saved requests or those pre-saved and not yet approved.

According to a first aspect, a method is proposed for ordering a service, wherein, after:
- a generation, by a human-machine interface (IHM) available to a user (UT), of an order signal (SC) for a service, during playback by a playback device (TV) of multimedia content corresponding to multimedia data received in a multimedia data stream by a terminal (STB) connected to the playback device (TV), said multimedia content comprising a plurality of sequences containing information relating to respective services, at respective playback times in the content, and a transmission of the order signal with a generation timestamp of the order signal and a user reference, to a management server (SER) processing the order signal for the service with a view to saving the order for the service for this user, the terminal receiving, in addition to the multimedia data, data:

of respective scheduled playback timestamps of the sequences, with respective service identifiers, the method includes:

comparing (S3) the generation timestamp of the order signal (HRC) with the respective scheduled playback timestamps of the sequences (HR1, HR2, ... ), selecting (S4), based on a predetermined criterion, a timestamp among the scheduled playback timestamps of the sequences as corresponding to the generation timestamp of the order signal, determining (S5) the service identifier corresponding to the selected timestamp, and generating (S6, S7) a signal to save an order for the service whose identifier is thus determined.

Thus, such an embodiment makes it possible to differentiate the service (or the product as presented above) whose sequence has caused an order signal to be sent from the human-machine interface (IHM) and to do so without forcing the user (UT) of this interface (IHM) to specify all the characteristics needed to identify this service.

Figure 2:
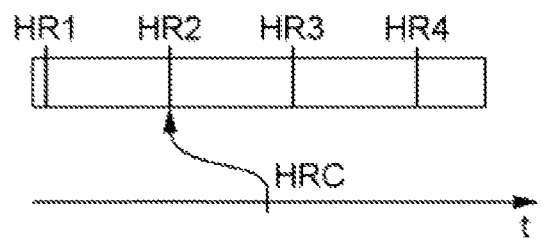

In one embodiment, the predetermined criterion consists of selecting the closest scheduled playback timestamp prior to the generation timestamp of the order signal. As illustrated in FIG. 2 by way of example, in a succession of scheduled playback timestamps HR1, HR2, etc. of respective sequences, the closest timestamp prior to the generation timestamp HRC of the order signal is HR2. In one embodiment, it is further possible to add a latency time, which may be constant (for example five seconds), to the timestamps HR1, HR2, etc., and to select the closest accordingly increased timestamp that precedes timestamp HRC, in order to take into account a possible user reaction time. The duration of this latency can be adjusted based on tests carried out on a panel of users.

In one embodiment, the aforementioned human-machine interface can be a connected voice assistant (for example a "djingo"® type of connected speaker). For example, this voice assistant can be connected to a home gateway via a local area network, this gateway being able to communicate with the management server SER via a wide area network.

Figure 1:
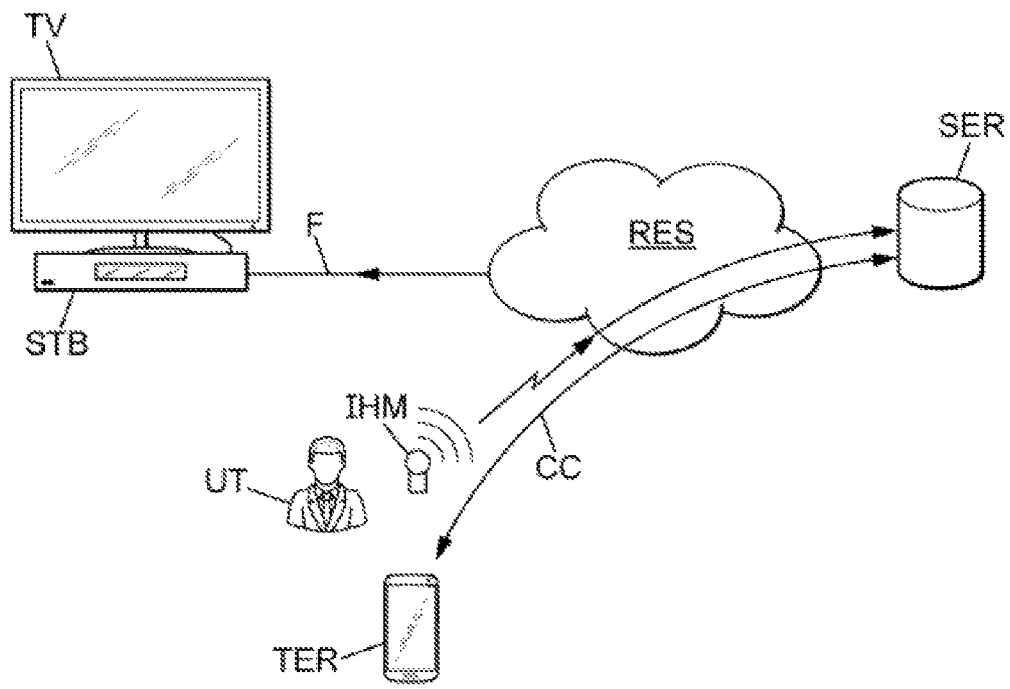
FIG. 1 illustrating an example of a system for implementing the above method, and FIG. 2 illustrating the search within stream F for the scheduled sequence timestamp closest to the order timestamp.

In a variant, this voice assistant can be integrated into a device such as a smartphone or other device (the interface including a microphone of such a device), this device being connected via the wide area network (cellular or wifi) to the server SER. This may for example be the same device TER (FIG. 1) comprising an input interface enabling the user to subsequently confirm his or her order.

In such an embodiment, the generated order signal is then a speech signal.

Thus, the method may include a conversion of the speech signal into text containing a series of characters (called a "speech to text" conversion) in order to identify at least one keyword characterizing a service order, for example such as the word "Add" or the like. For example, this or these keyword(s) may describe the type of service ordered: for example a product order ("Add this product"), an order for a discount coupon ("Add this discount"), or the like.

More generally, variants to the use of a voice assistant are possible for the actuation of the aforementioned human-machine interface. Indeed, as an alternative to the user saying the word "Add" to order a service, it is possible, for example, to provide a remote control for the terminal STB comprising a specific button to press in order to send the service order to the terminal STB which can send the order request on to the management server STB via a bidirectional link. In another alternative, the aforementioned device TER can offer a computer application with an order button which, when pressed, causes this order request to be sent to the management server SER via the network RES.

In one embodiment, the method further comprises:

after determining the service identifier corresponding to the selected timestamp, obtaining, based on the service identifier, additional informational data about the service, managing a rendering of additional informational data about the service, with a view to the user approving the saving of the order for the service, on an input interface available to the user.

For example, the additional informational data may come from a connected database, listing service identifiers that link to additional informational data about respective services.

This typically can be a database connected to a server managed by an advertiser of the service or services offered in the multimedia content.

Furthermore, the aforementioned additional informational data can be received at the terminal (STB), for rendering by the playback device (TV).

However, alternatively, it is possible to transmit this additional informational data on the user's device (TER).

In one embodiment where the aforementioned input interface is integrated into a user device (TER), this device being connected at least to the management server (SER):

the signal to save the order for the service can be generated by the management server, transmitted to the aforementioned device (TER) for user confirmation of such a save, and if approved by the user, returned by the device (TER) to confirm the saving of the order.

It will thus be understood that in this embodiment, the signal to save the order in fact concerns a pre-saving of the order, and this order is finally saved only after approval by the user. For example, the device (TER) can receive from the management server (SER) (or from a server managed by a service provider) an order confirmation request to be approved for example via a touch screen of the device (TER). For example, the device (TER) can present on a screen a list of services for which the order is to be confirmed and the user can select them one by one to approve them by pressing on the various services offered to him or her on the touch screen.

It will be understood here that the management server SER may be a single server for implementing the various steps above or may be connected to other servers (managed by the advertiser, by the service provider, and/or others), thus forming a "server entity" in general (also called a "platform" in the detailed description which follows).

In one embodiment, the aforementioned timestamp comparison in order to select the timestamp corresponding to the generation timestamp of the order signal, and the determination of the service identifier corresponding to the selected timestamp, at least, are carried out by the management server (SER).

In this case, the server (SER) queries the terminal (STB) receiving the stream in order to retrieve the timestamps of the sequences scheduled in the stream, and to carry out the aforementioned comparison.

Alternatively, the server (SER) can query a third-party server (SERA) which provides a publication of the timestamps of the scheduled sequences, with the corresponding identifiers, this third-party server (SERA) being maintained by an advertising division of a TV broadcasting channel for example. Thus, by querying this third-party server, it is possible to retrieve the timestamps of the advertising sequences.

In another alternative, the timestamp comparison in order to select the timestamp corresponding to the generation timestamp of the order signal, and the determination of the service identifier corresponding to the selected timestamp, are carried out by the terminal (STB), and this terminal (STB) sends to the management server the service identifier corresponding to the selected timestamp.

This embodiment can be particularly advantageous in the case where a remote control button is simply pressed by the user to control the terminal (STB) instead of providing a voice assistant type of interface IHM. In this case, it is the terminal (STB) which performs the comparison between the timestamps of the sequences it receives and the timestamp of the event of pressing the remote control button, until it is thus able to retrieve the identifier of the service whose sequence has the closest timestamp and to send this service identifier to the server (SER).

In this embodiment, as in the previous embodiment, it is of course arranged that the server (SER) stores a database of users which links to:
  a reference for their voice assistant type of interface (IHM) from which the server receives the signal to save the order,
  a reference for their terminal (STB) receiving the stream, and at least one reference for their device (TER).

Furthermore, the aforementioned multimedia data stream (F) can typically be a television or radio data stream, broadcast in real time (or slightly delayed), or rebroadcast or "replay" (or else a broadcast data stream, recorded for example on a personal video recorder (or "PVR") and played back).

Thus, advertising spots can appear in this stream that correspond to the aforementioned sequences containing information relating to respective services. In principle, the expected broadcast time of these sequences (in real time, relative to the moment when the data is sent from a station headend; or deferred, relative to the moment when the stream begins to be read) is known and a timestamp can thus be associated with each sequence and thence with each service identifier corresponding to this sequence. In general, during replay the terminal can play a list ("playlist") of several video streams often comprising a chain of N streams starting with one or more advertising sequences and continuing with content.

According to another aspect, a device is provided that is configured for, with a view to ordering a service and after:
  a generation, by a human-machine interface (IHM) available to a user (UT), of an order signal (SC) for a service, during playback by a playback device (TV) of multimedia content corresponding to multimedia data received in a multimedia data stream by a terminal (STB) connected to the playback device (TV), said multimedia content comprising a plurality of sequences containing information relating to respective services, at respective playback times in the content,
  and a transmission of the order signal with a generation timestamp of the order signal and a user reference, to a management server (SER) processing the order signal for the service with a view to saving the order for the service for this user,
the terminal receiving, in addition to the multimedia data, data:
  of respective scheduled playback timestamps of the sequences,
  with respective service identifiers,
implementing:
  comparing the generation timestamp of the order signal with the respective scheduled playback timestamps of the sequences,
  selecting, based on a predetermined criterion, a timestamp among the scheduled playback timestamps of the sequences as corresponding to the generation timestamp of the order signal,
  determining the service identifier corresponding to the selected timestamp,
  and generating a signal to save an order for the service whose identifier is thus determined.

Such a device can be a management server (SER) which, as indicated above, can be configured to implement steps of the above method and more particularly the aforementioned timestamp comparison in order to select the timestamp corresponding to the generation timestamp of the order signal, and the determination of the service identifier corresponding to the selected timestamp.

Alternatively, such a device can be a terminal (STB) for receiving a multimedia data stream (F), configured to implement steps of the above method and more particularly the timestamp comparison in order to select the timestamp corresponding to the generation timestamp of the order signal, the determination of the service identifier corresponding to the selected timestamp, and a transmission to the management server of the service identifier corresponding to the selected timestamp.

According to another aspect, a system for ordering a service is proposed, comprising at least:
  a terminal for receiving a multimedia data stream,
  a playback device, connected to the terminal, for playing multimedia content corresponding to the multimedia data, said multimedia content comprising a plurality of sequences containing information relating to respective services, at respective playback times in the content,
  a human-machine interface available to a user for generating an order signal for a service whose sequence may currently be in the process of being played by the device, and transmitting the order signal with a generation timestamp of the order signal and a user reference,
  a management server, able to process the order signal for the service with a view to saving an order for the service for this user,
wherein the terminal is arranged to receive, in addition to the multimedia data, data of:
  respective scheduled playback timestamps of the sequences,
  with respective service identifiers,
and at least one among the terminal and the management server is arranged for:

comparing the generation timestamp of the order signal with the respective scheduled playback timestamps of the sequences, selecting, based on a predetermined criterion, a timestamp among the scheduled playback timestamps of sequences as corresponding to the generation timestamp of the order signal, determining the service identifier corresponding to the selected timestamp, and generating a signal to save the order for the service whose identifier is thus determined.

According to another aspect, a computer program is provided comprising instructions for implementing all or part of a method as defined herein when this program is executed by a processor. According to another aspect, a non-transitory computer-readable storage medium is provided, on which such a program is stored.

Although the present disclosure has been described with reference to one or more examples, workers skilled in the art will recognize that changes may be made in form and detail without departing from the scope of the disclosure and/or the appended claims.

The invention claimed is:

1. A method comprising:
ordering a purchase of a service, a sequence relating to said service being comprised in a multimedia data stream played by a playback device, the multimedia data stream being received by a terminal which is connected to the playback device, the multimedia data stream comprising a plurality of sequences relating to respective services and associated with respective playback timestamps, the ordering being implemented by a management server which is distinct from the terminal receiving the multimedia data stream and comprising:
in response to a reception of an order signal, sent by a first user terminal being distinct from the terminal receiving the multimedia data stream and from the playback device, for purchasing a service associated with a sequence of the multimedia data stream played by the playback device, determining a service identifier as a function of a reception timestamp of the order signal for purchasing the service, the service identifier having previously been associated to a playback timestamp of a sequence associated with a service corresponding to the reception timestamp of the order signal for purchasing the service, the service identifier making it possible to generate a signal to save the purchase, and
transmitting, by the management server to a second user terminal, the signal to save the purchase.

2. The method according to claim 1, wherein the method comprises determining, based on a predetermined criterion, a timestamp among scheduled playback timestamps of sequences as corresponding to the generation timestamp of the order signal.

3. The method according to claim 2, wherein said predetermined criterion consists of selecting a closest scheduled playback timestamp prior to the generation timestamp of the order signal.

4. The method according to claim 3, wherein a predetermined duration, of a latency, is added to each of the scheduled playback timestamps in order to select the closest scheduled playback timestamp prior to the generation timestamp of the order signal and increased by said predetermined duration.

5. The method according to claim 4, wherein the first user terminal is a voice assistant and the method comprises a conversion of a speech signal into text containing a series of characters in order to identify at least one keyword characterizing a service order.

6. The method according to claim 1, further comprising:
after determining the service identifier corresponding to the determined timestamp, obtaining, based on the service identifier, additional informational data about the service,
managing a rendering of additional informational data about the service, with a view to a user approving the saving of the order for the service, on the second user terminal.

7. The method according to claim 6, wherein the additional informational data comes from a connected database, listing service identifiers linking to additional informational data about respective services.

8. The method according to claim 1, wherein the multimedia data stream is a television or radio data stream, broadcast in real time or slightly delayed.

9. A management server comprising:
at least one processor configured to order a purchase of a service, a sequence relating to said service being comprised in a multimedia data stream played by a playback device, said multimedia data stream being received by a terminal which is connected to said playback device and distinct from the management server, the multimedia data stream comprising a plurality of sequences relating to respective services and associated with respective playback timestamps, the ordering comprising:
in response to a reception of an order signal, sent by a first user terminal distinct from the terminal receiving the multimedia data stream and from the playback device, for purchasing a service associated with a sequence of the multimedia data stream played by the playback device, determining a service identifier as a function of a reception timestamp of the order signal for purchasing the service, the service identifier having previously been associated to a playback timestamp of a sequence associated with a service corresponding to the reception timestamp of the order signal for purchasing the service, the service identifier making it possible to generate a signal to save the purchase; and
transmitting, by the management server to a second user terminal, said signal to save the purchase.

10. The management server according to claim 9, wherein the management server is configured to receive the order signal generated by a human-machine interface.

11. The management server according to claim 10, wherein the management server comprises a timestamp comparator for determining the timestamp corresponding to the generation timestamp of the order signal.

12. The management server according to claim 10, wherein the management server is connected to the second user terminal integrating at least one input interface, the management server comprising:
a generator of the signal to save the order for the service,
a transmitter sending the signal to save the order for the service to the second user terminal, for a user to approve the save, and
a transmitter configured to return to the second user terminal the signal to save the order, for confirmation of the saving of the order upon receipt by the management server of an approval signal from the device after the user enters his or her approval through the at least one input interface.

13. A first user terminal configured to be connected to a management server distinct from a terminal receiving a multimedia data stream played by a playback device, the multimedia data stream comprising a plurality of sequences relating to respective services and associated with respective playback timestamps, wherein the first user terminal comprises:
- a generator of an order signal for purchasing a service, the order signal having a generation timestamp; and
- a transmitter configured to transmit the order signal with the generation timestamp of the order signal and a user reference for purchasing the service to a management server distinct from the terminal receiving the data stream, the generation timestamp of the order signal making it possible to determine a playback timestamp of the sequence associated with said service, the playback timestamp of the sequence associated with said service making it possible to determine a service identifier enabling generation of a signal to save the purchase, said user reference being used to retrieve from a database a reference of a second user terminal, said second user terminal being different from the terminal receiving the multimedia data stream, and said signal to save the purchase being transmitted by the management server to said second user terminal.

14. The first user terminal according to claim 13, comprising a connected voice assistant and wherein the generated order signal is a speech signal.

15. A non-transitory computer-readable storage medium on which is stored a program for implementing a method when this program is executed by at least one processor of a management server, the method comprising:
- ordering a purchase of a service, a sequence relating to said service being comprised in a multimedia data stream played by a playback device, said multimedia data stream being received by a terminal which is connected to said playback device and distinct from the management server, the multimedia data stream comprising a plurality of sequences relating to respective services and associated with respective playback timestamps, wherein the ordering comprises:
- in response to a reception of an order signal, sent by a first user terminal distinct from the terminal receiving the multimedia data stream and from the playback device, for purchasing a service associated with a sequence of the multimedia data stream played by the playback device, determining a service identifier as a function of a reception timestamp of the order signal for purchasing the service, the service identifier having previously been associated to a playback timestamp of a sequence associated with a service corresponding to the reception timestamp of the order signal for purchasing the service, the service identifier making it possible to generate a signal to save the purchase; and
- transmitting said signal to a second user terminal to save the purchase.

* * * * *